United States Patent
De Sabatino

(10) Patent No.: US 9,655,049 B2
(45) Date of Patent: May 16, 2017

(54) APPARATUS AND METHOD FOR DISPLAYING INFORMATION

(71) Applicant: MOTOROLA SOLUTIONS, INC., Schaumburg, IL (US)

(72) Inventor: John M De Sabatino, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 116 days.

(21) Appl. No.: 14/690,730

(22) Filed: Apr. 20, 2015

(65) Prior Publication Data
US 2016/0309413 A1  Oct. 20, 2016

(51) Int. Cl.
*H04W 4/10* (2009.01)
*H04W 52/02* (2009.01)
*H04L 5/16* (2006.01)
*H04L 29/06* (2006.01)
*H04W 76/00* (2009.01)

(52) U.S. Cl.
CPC .......... *H04W 52/0229* (2013.01); *H04L 5/16* (2013.01); *H04L 29/06442* (2013.01); *H04L 65/4061* (2013.01); *H04W 52/027* (2013.01); *H04W 76/005* (2013.01); *H04W 4/10* (2013.01); *Y02B 60/50* (2013.01)

(58) Field of Classification Search
CPC .............................. H04W 76/005; H04W 4/10
USPC .......... 455/566, 518, 519, 67.11, 550.1, 517, 455/552.1
See application file for complete search history.

(56) References Cited

U.S. PATENT DOCUMENTS

| | | | |
|---|---|---|---|
| 6,415,158 B1* | 7/2002 | King | H04W 88/06 455/552.1 |
| 7,412,226 B2* | 8/2008 | Kayzar | H04M 1/27455 379/37 |
| 2007/0243835 A1* | 10/2007 | Zhu | H04B 1/3833 455/90.2 |
| 2013/0150115 A1* | 6/2013 | Maggenti | H04M 1/656 455/518 |

* cited by examiner

Primary Examiner — John J Lee

(57) ABSTRACT

During operation, a push-to-talk (PTT) button will have a touch sensor incorporated on its surface. When the touch sensor detects a touch from a user, the apparatus will exit a low-power state and a display on the apparatus will provide PTT information.

11 Claims, 4 Drawing Sheets

APPARATUS AND METHOD FOR DISPLAYING INFORMATION

BACKGROUND OF THE INVENTION

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

When using a PTT radio to communicate, it is important for the user to know the talkgroup they currently selected for transmit and receive communications. Oftentimes talkgroup information is provided on a display incorporated into the radio/device or by a physical rotary knob with fixed, discrete positions. Many radios employing PTT also employ a power-savings mode in order to extend battery live. Oftentimes the power-savings mode will turn off any display in order to save power, making it difficult to determine the current talkgroup, particularly if the PTT radio contains no physical knobs or switches to determine the selected talkgroup. With the display turned off, there will be no means to check talkgroup, scan state, or link status when PTT is pressed. This means when PTT is pressed, user may not know the talkgroup used to start the call. Since standby (power savings) will be the predominant state of the device, this will be often the case. Therefore, a need exists for a method and apparatus for displaying information on a radio that alleviates the above-mentioned issue.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
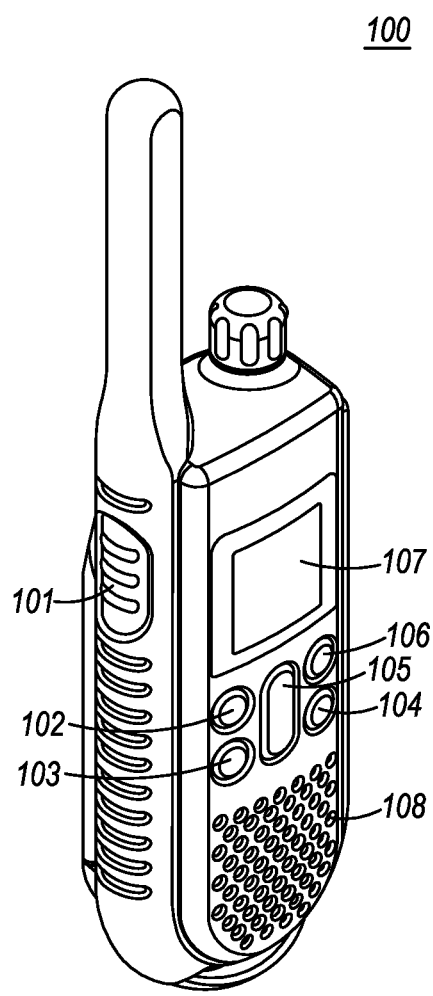
FIG. 1 illustrates a push-to-talk (PTT) radio.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above mentioned need, a method and apparatus for displaying information is provided herein. During operation, a PTT button will have a touch sensor incorporated on its surface. When the touch sensor detects a touch from a user, the apparatus will exit a low-power state (awake) and a display on the apparatus will provide PTT information.

The sensor is preferably integrated within the PTT button, may be capacitive, resistive or a proximity detector. When the PTT button it touched, the display transitions from power-savings mode to a display mode. The display will provide critical and essential PTT information such as, but not limited to a channel, a talkgroup, or any information deemed useful to the user.

Following a period of inactivity, the micro-processor enters sleep and the display will automatically turn off, entering a power-savings mode. In one embodiment of the present invention, a hold-off time is allowed to pass prior to waking-up the micro-processor and enabling the display once the PTT button has been contacted by the user. If the PTT button is pressed before the hold-off timer expires, then it can be assumed that the user is not interested in receiving call status, so only the micro-processor wakes-up while the display remains disabled. On the other hand, if a display hold-off timer expires prior to the PTT button being pressed, then it can be assumed that the user is interested in PTT information. In this case, both the micro-processor and the display are enabled and talkgroup information is provided on display.

Because the contact sensor is integrated with the PTT button, a single action is required to turn display on, ascertain talkgroup, and then start the call. This enables the PTT Radio to anticipate the needs of the user. This is particularly useful in those situations where gloved operation is required. Typically, the PTT switch is large to allow simple operation with or without gloves. But due to the need to keep the PTT radio small and portable, all other buttons are generally much smaller or replaced with a touch screen, making gloved operation much more difficult.

FIG. 1 illustrates push-to-talk (PTT) radio 100. As shown, radio 100 comprises PTT button 101, user interface buttons 102-106, display/screen 107, and speaker 108. PTT button 101 comprises a standard button, that when pressed, transitions radio 100 from a listening state, to a transmit state. As discussed, PTT button 101 preferably comprises a proximity sensor or touch-sensitive surface, such as a touchpad for activating display 107. In some embodiments, the touchpad is a touch-sensitive area of the PTT button that unlike a touch screen, does not display visual output.

Interface buttons 102-106 serve as means for controlling and/or programming radio 100. More particularly, buttons 102-106 serve as a man-machine interface, and are used for controlling radio 100. In some PTT radio embodiments, these other buttons may not be present, and may be replaced with a touch display interface.

Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof. Some or all of the visual output may correspond to PTT information, further details of which are described below.

Speaker 108 comprises a standard speaker for outputting audio. More particularly, speaker 108 converts an electrical signal generated from an active application to human-audible sound waves.

Figure 2:
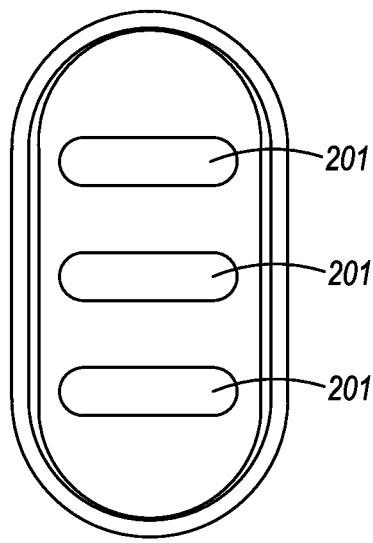
FIG. 2 illustrates a PTT button.

FIG. 2 illustrates PTT button 101 comprising touch-sensitive surface 201. In this particular embodiment, touch-sensitive surface 201 is implemented as three "strips" existing on the surface of PTT button 101, however in alternate embodiments of the present invention, touch-sensitive surface 201 may take other forms, such as more or fewer "strips", a compete surface of button 101, circular regions existing on button 101, or through a proximity sensor on the PTT edge with proximity focus angled towards the center of the switch . . . , etc. It should be noted that touch-sensitive surface 201 does not control when device 100 transmits or listens for communications from other radios. More particularly, touch-sensitive surface 201 controls when device 100 leaves a low-power state to display PTT information on display 107, and does not cause radio 100 to transmit in a half-duplex mode. The low-power state preferably comprises a state where display 107 is off, and not displaying any information, or alternatively, displaying minimal information compared to when the display is in a higher-power state (awake).

Touch-sensitive surface 201 also accepts contact from the user and activates screen 107 as discussed above. Touch-sensitive surface 201 detects contact (and any movement or break of the contact) on touch-sensitive surface 201 and converts the detected contact into interaction with display 107, such as exiting display 107 and/or processor 403 from a low-power state. In an exemplary embodiment, a point of contact between touch-sensitive surface 201 and the user corresponds to one or more digits of the user. Touch-sensitive surface 201 may detect contact using any of a plurality of touch sensitivity technologies, including but not limited to capacitive, resistive, infrared, and surface acoustic wave technologies, as well as other proximity sensor arrays or other elements for determining one or more points of contact with touch-sensitive surface 201.

Figure 3:
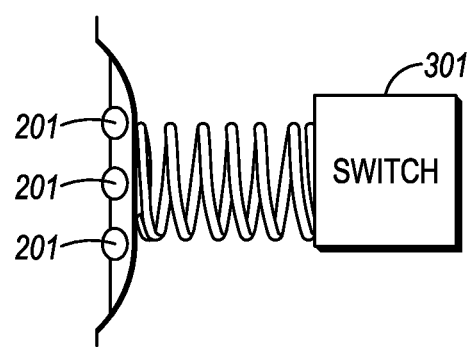
FIG. 3 is a cutaway view of a PTT button.

FIG. 3 is a cutaway view of PTT button 101. In addition to touch-sensitive surface 201, PTT button 101 also comprises a spring-actuated switch so that the physical depressing (pressing) of button 101 causes radio 100 to enter a half-duplex transmit state. Therefore, as discussed, making contact with surface 201 will cause a processor and/or display to exit a low-power state. Information to be displayed on display 107, however, will not cause radio 100 to enter or leave a ½ duplex mode of transmission. Entering or leaving a ½ duplex mode of transmission is controlled by switch 301 being activated/inactivated. In a preferred embodiment of the present invention, the display is maintained in the low-power state when operating in ½ duplex transmit mode.

Figure 4:
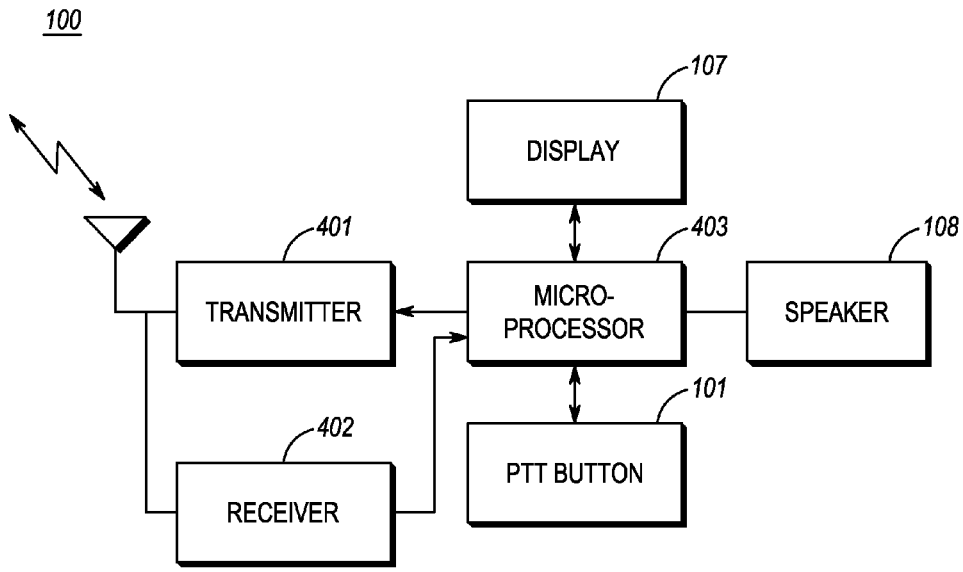
FIG. 4 is a block diagram of the radio of FIG. 1.

FIG. 4 is a block diagram of the radio of FIG. 1. As shown, radio 100 may include transmitter 401, receiver 402, display 107, logic circuitry (processor) 403, and PTT button 101. In other implementations, radio 100 may include more, fewer, or different components.

Transmitter 401 and receiver 402 may be well known long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 401 and receiver 402 may also contain multiple transmitters and receivers, to support multiple communications protocols simultaneously.

Logic circuitry 403 comprises a digital signal processor (DSP), general purpose microprocessor, a programmable logic device, an Application Processor, or application specific integrated circuit (ASIC) and is utilized to control information displayed on display 107 based on a user making contact to PTT button 101. As discussed above, processor 403 operates in a low-power sleep state during periods of radio inactivity, waking upon a user making contact with touch-sensitive surface 201.

During operation, logic circuitry 403 receives an input from PTT button 101. As discussed above, the input may comprise an indication that a user has made contact with PTT button by touching surface 201 (without depressing the PTT button), or that the user has made contact with the PTT button by depressing the PTT button, activating switch 301. If the user has made contact with the PTT button without depressing the PTT button, then logic circuitry 403 will awake (if in sleep mode) and display PTT information on display 107 by taking display 107 out of a low-power state. It should be noted that if display 107 is already out of the low-power state, logic circuitry 403 will not need to wake display 107.

If, however, logic circuitry 403 received an indication that PTT button 101 was both contacted and pressed, then logic circuitry 403 will cause transmitter 401 to transmit voice received from a microphone. If display 107 is in a low-power state, logic circuitry 403 will keep display 107 in a low-power state while transmitting.

As discussed above, a timer (not shown in FIG. 4) may be utilized so that processor 403 and display 107 will not exit a low-power state unless contact with button 101 occurs for a predetermined amount of time (e.g., 300 ms). If switch 301 is activated prior to the timer expiring, processor 403 and display 107 will remain in a low-power state.

Figure 5:
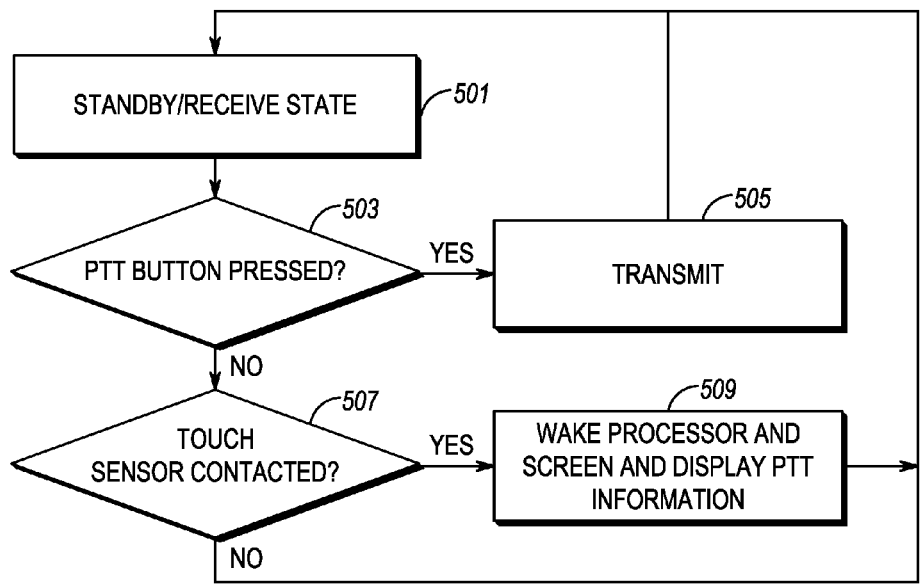
FIG. 5 is a flowchart showing operation of the device of FIG. 1 and FIG. 2.

FIG. 5 is a flowchart showing operation of the device of FIG. 1 and FIG. 2. The logic flow of FIG. 5 assumes that radio 100 is operating in a low-power state (i.e., at least components such as processor 403 and screen 107 are operating in a low-power state). The low-power state is sometimes referred to as a "standby state". It should be noted that in radios where multiple processors exist, at least one processor is in a standby state. For example, a dedicated processor (not shown) may always be in an active state controlling receiver 402. The logic flow begins at step 501 where radio 100 is operating in a standby/receive state. As discussed above, this standby/receive state may comprise display 107 and at least one processor operating in a low-power state. Processor 403 then determines if the PTT button was pressed (step 503), and if not, the logic flow continues to step 507. If, however, the PTT button was pressed (as determined by switch 301), then processor 403 instructs radio 100 to transmit using transmitter 401 (step 505). At 507 processor 403 determines if touch sensor (touch-sensitive surface) 201 has been contacted. As discussed above, step 507 may comprise determining if sensor 201 has been contacted for more than a predetermined amount of time. If, at step 507 it has been determined that sensor 201 has been contacted, then the logic flow continues to step 509 where processor 403 and screen 107 are awaken, and PTT information is displayed on screen 107. PTT information may comprise information such as, but not limited to a zone/channel, folder/sub-folder or Talkgroup, a scan state (hang time so talkback is allowed, or default talkgroup/channel if hang time expired), a secure/clear setting, a direct/repeater setting, and/or a dynamic regrouping indication.

The above flow chart results in a radio that receives an indication from a push-to-talk (PTT) button that the PTT button was pressed or contacted, and wakes component(s) of a radio from a low-power state if the PTT button was contacted but not pressed. As discussed, the radio is operated in a ½ duplex transmit mode if the PTT button was pressed otherwise operated in a ½ duplex receive mode.

Thus, a radio is provided that comprises a receiver, a transmitter, a push-to-talk (PTT) button having a touch-sensitive surface, and a processor receiving an input from the PTT button. The processor is configured to wake component(s) of a radio (e.g., a processor and/or a display) from a low-power state if the PTT button was contacted but not pressed, otherwise keep the component(s) in a low-power state. The processor is additionally configured to operate the transmitter in a ½ duplex transmit mode if the PTT button was pressed otherwise utilize the receiver in a ½ duplex receive mode.

It should be noted that the above-described radio may again enter a low-power state (sleep) after awaking. For example, after awaking (exiting the low-power state), radio 100 may again enter the low-power state after a period of inactivity. In addition, touch sensor loss of contact can be used to determine when to turn off display (e.g., again enter a low-power state). More particularly, logic circuitry 403 may determine that sensor 201 is not being contacted by a user. When this happens, logic circuitry 403 may instruct screen 107 to immediately turn off (enter a low-power state) or, may wait a predetermined amount of time before instructing screen 107 to turn off.

Figure 6:
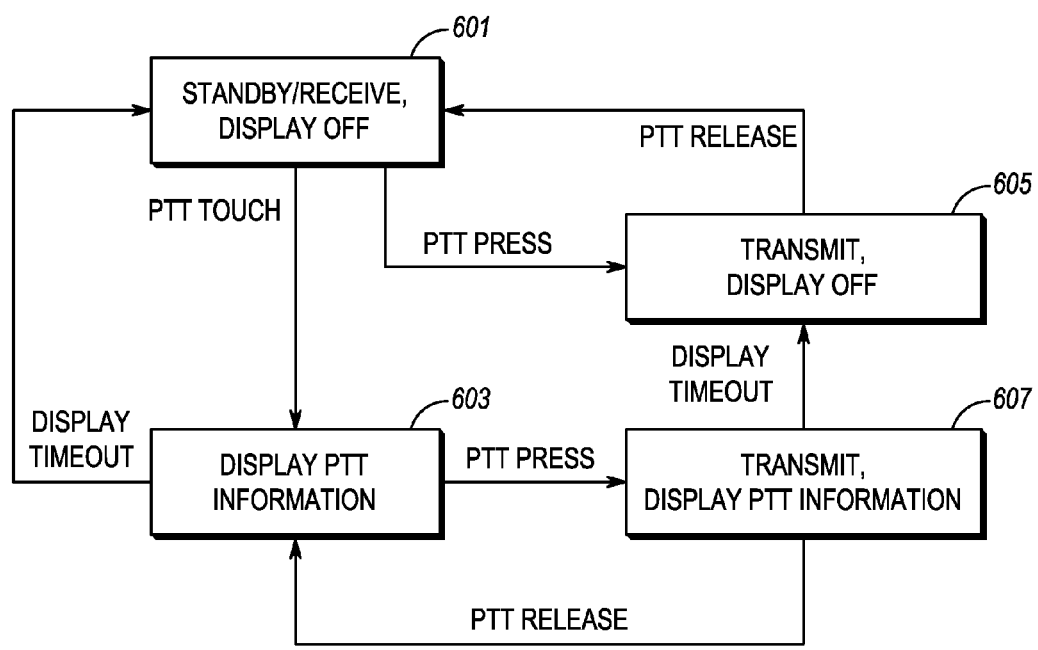
FIG. 6 is a flowchart showing operation of the device of FIG. 1 and FIG. 2.

FIG. 6 is a flowchart showing operation of the device of FIG. 1 and FIG. 2. The logic flow begins at step 601 where radio 100 is operating in a low-power state (i.e., at least components such as processor 403 and screen 107 are operating in a low-power state). The low-power state is sometimes referred to as a "standby state", or a "receive state". It should be noted that in radios where multiple processors exist, at least one processor is in a standby state. For example, a dedicated processor (not shown) may always be in an active state controlling receiver 402. If, in step 601 a PTT touch event is received by touch sensor 201 then the logic flow proceeds to step 603 where PTT information is displayed on screen 107. If, at step 601 a PTT press event was received by switch 301, then the logic flow continues to step 605 where transmitter 401 is activated for transmission. At step 605, display 107 operates in a low-power state (e.g., display 107 is off). Upon a PTT release detected by switch 301, the logic flow again returns to step 601. Returning to step 603, if switch 301 detects a PTT press, then the logic flow continues to step 607 where transmitter 401 is activated for transmission. At step 607, display 107 operates in a high-power state (e.g., display 107 is on, displaying PTT information). Upon PTT release, the logic flow returns to step 603. At both steps 603 and 607, if logic circuitry 403 determines that the display has been active for longer than a predetermined amount of time (timeout event), the logic flow returns to step 601 (from step 603) or to step 605 (from step 607).

In the foregoing specification, specific embodiments have been described. However, one of ordinary skill in the art appreciates that various modifications and changes can be made without departing from the scope of the invention as set forth in the claims below. For example, that a PTT radio could actually be composed of a modem processor and an application processor. Application processors are extremely power-intensive and it is the combination of waking the application processor and enabling the display which can consume significant power. The application processor may be woken up as discussed above, with the modem processor continuously operating within a higher-power state (awake). Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising the steps of:
receiving an indication from a push-to-talk (PTT) button that the PTT button was pressed or contacted;
waking at least one component of a radio device from a low-power state if the PTT button was contacted but not pressed, otherwise keeping the at least one component in the low-power state;
operating the radio device in half duplex transmit mode if the PTT button was pressed otherwise operating the radio in half duplex receive mode.

2. The method of claim 1 wherein the step of waking component(s) of the radio comprises the step of waking a display of the radio.

3. The method of claim 1 wherein the step of waking component(s) of the radio comprises the step of waking a display of the radio and displaying PTT information.

4. The method of claim 1 wherein the step of waking component(s) of the radio comprises the step of waking a processor of the radio.

5. The method of claim 1 wherein the step of waking component(s) of a radio from a low-power state when the PTT button was contacted comprises the step of waking the component(s) of the radio only when the button was contacted for longer than a predetermined amount of time.

6. The method of claim 1 wherein the step of receiving the input from the PTT button comprises the step of receiving the input from a touch-sensitive surface on the PTT button.

7. An apparatus comprising:
a receiver;
a transmitter;
a push-to-talk (PTT) button having a touch-sensitive surface;
a processor receiving an input from the PTT button, the processor configured to wake at least one component of a radio device from a low-power state if the PTT button was contacted but not pressed, otherwise keep the at least one component in the low-power state, the processor additionally configured to operate the transmitter in a half duplex transmit mode if the PTT button was pressed otherwise utilize the receiver in a half duplex receive mode.

8. The apparatus of claim 7 wherein the component(s) comprise a display of the radio.

9. The apparatus of claim 7 wherein the component(s) comprise the processor.

10. An apparatus comprising:
a receiver;
a transmitter;
a push-to-talk (PTT) button having a touch-sensitive surface;
a display;
a processor receiving an input from the PTT button, the processor configured to wake the display and display PTT information on the display if the PTT button was contacted but not pressed, otherwise keep the display in a low-power state, the processor additionally configured to operate the transmitter in a half duplex transmit mode if the PTT button was pressed otherwise utilize the receiver in a half duplex receive mode.

11. The apparatus of claim 10 wherein the display is maintained in the low-power state when operating in ½ duplex transmit mode.

* * * * *